C. OLHABER.

Cooking Stove.

No. 3,642. Reissued Sept. 21, 1869.

Witnesses:
Jas H Lawyman.
Saml Knight Jr.

Inventor:
C. Olhaber
By Knight Bros.
Attys.

N. PETERS, Photo-Lithographer, Washington, D. C.

United States Patent Office.

CLEMENT OLHABER, OF CINCINNATI, OHIO.

*Letters Patent No.* 86,578, *dated February* 2, 1869; *reissue No.* 3,642, *dated September* 21, 1869.

COOKING-STOVE.

The Schedule referred to in these Letters Patent and making part of the same.

*To all whom it may concern:*

Be it known that I, CLEMENT OLHABER, of Cincinnati, Hamilton county, Ohio, have invented a new and useful Improvement in Cooking-Stoves; and I hereby declare the following to be a full, clear, and exact description thereof, reference being had to the accompanying drawings, making part of this specification.

The first part of my invention relates to a construction of the "long-centres" of a cook-stove, which obviates the liability to warping or sagging, to which such plates are now liable.

The second part of my invention relates to a provision of a sliding door to a stove-oven, the said door in the preferred form of my invention, and the slides in which it works, having corresponding wedge or oblique surfaces, which, when the door is shut, serve to close it tightly against the jamb.

The third part of my invention consists in a mode of fastening the slides to the jamb.

Figure 1:
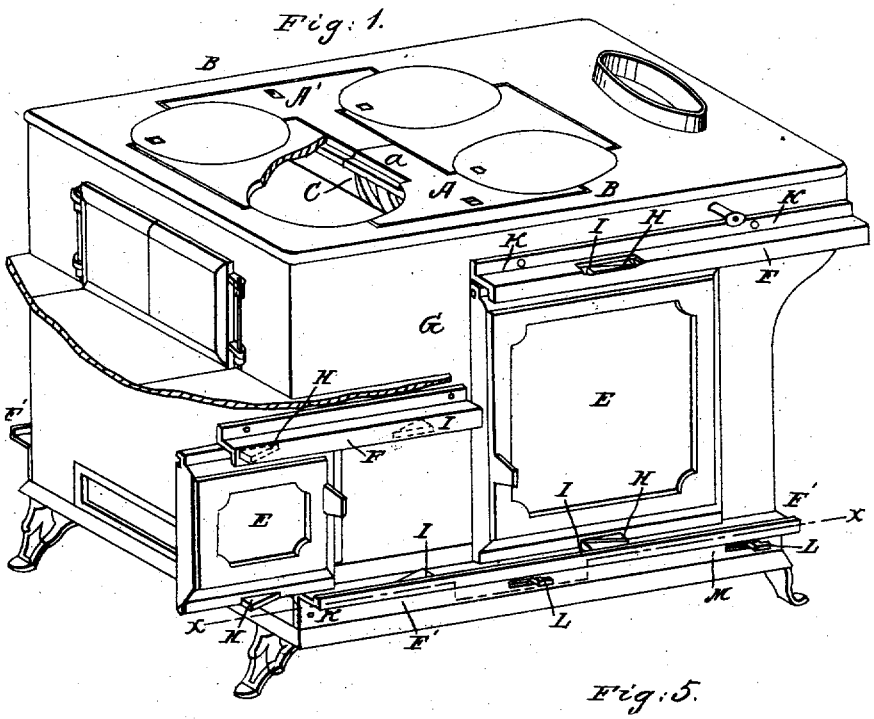
Figure 1 is a perspective view of a stove embodying my invention, portions being broken away to expose the operating-parts.
Figure 5:
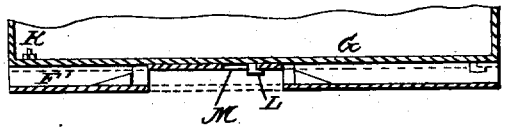
Figure 5 is a horizontal section at the line *x–x*, fig. 1.
Figure 2:
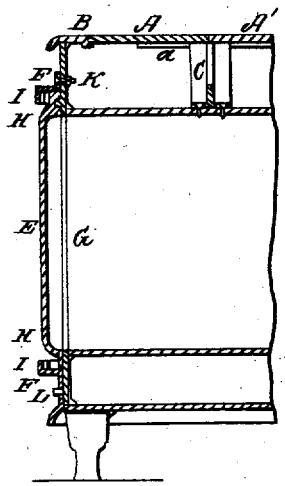
Figure 2 is a transverse section through a portion of the stove.
Figure 3:
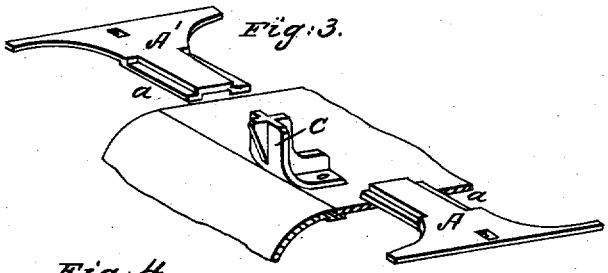
Figure 3 represents the two portions of the long-centre, and their supporting-post detached.
Figure 4:
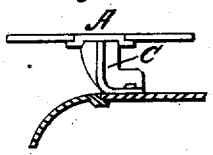
Figure 4 is a side elevation of the post and one portion of the long-centre.

I form the plate commonly called the "long-centre," in two parts, A A′, whose outer ends rest in the customary rebates B, and whose inner ends are supported upon a foot or standard, C, which rises from the top oven-plate D.

This post may have the represented X-formed transverse section, of such dimensions as to fit and occupy the recess between the customary stiffening-flanges *a* of the long-centre.

The common long-centre in one piece is, it is well-known, liable to expand on the under side by the action of the heat, causing it to sag or belly downward in the middle, so as to encroach upon the upper flue-space, and by throwing the short-centres and their lids out of their proper plane, to make the stove top leaky and unfit to support the vessels; and attempts to support the long-centre at its mid-length have but aggravated the evil by preventing the up-curved ends of the plate from resting upon their rebates.

I remove the above difficulties by the simple remedy of dividing the long-centre athwart at its mid-length, and supporting said divided portions upon the post C, in the manner represented.

The comparative shortness and stiffness of the two pieces A A′ protect them from any deleterious sagging or departure from their proper plane.

The oven-door or doors E, instead of being attached to the jamb by the customary hinge, occupy upper and lower slides F F′, on the jamb G, and each door is provided, near its mid-length, both at top and bottom, with an inclined projection or wedge, H, which, when the door is shut, binds against a similar wedge-like protuberance, I, upon the slide, and serves to press and hold the door snugly against the jamb, so as to completely close the oven.

All sliding doors have necessarily very free movement, because a change of temperature in the stove would otherwise cause them to jam, and the aforesaid provision of oblique binding-surfaces secures the effectual closure of the oven when the doors are shut, and yet permits the doors to be fitted quite loosely in their slides, so as to possess entire freedom of motion the instant that the door is released from the wedging-surfaces.

All the above slides, F F′, may be secured to the jambs by suitable screw-bolts K, or portions of them, where not convenient to apply bolts, may be held to the jamb by means of hooks L, which, projecting from the jamb, may engage in slots M in the slides, and bind therein as the latter is pressed endwise.

This arrangement permits the removal or application of a slide, without the necessity of reaching into a flue for the manipulation of bolts, &c.

A rearward extension, G′, of the jamb or side-plate G, forms a means of attachment of the rear end of the upper slide F, and also a brace for the rear side of the oven-door in its open position.

The doors E, upon the inside of their upper edges, have grooves *e*, which are occupied by strips *e′*, attached to or cast with the jamb G, the said strips serving to steady the movement of the doors.

An oven thus provided with sliding doors, can manifestly be closed much more tightly than by the customary swinging doors, and with less liability to be opened inadvertently by a pan inserted from the opposite side.

I have selected for illustration the preferred forms of my improvement, but reserve the right to vary the same.

For example, a pin, stud, or eccentric, might replace the inclined projection, either on the door or on the jamb.

I claim herein as new and of my invention—

1. The long-centre, composed of two pieces, A *a*, A′ *a′*, supported by the post C, in the manner set forth.

2. A sliding oven-door, provided with wedge-formed surfaces, substantially as and for the purpose set forth.

3. The slide F′, secured to the jamb by one or more hooks L, and one or more bolts K, as explained.

4. The provision of one or more extensions G′ upon the jamb G, substantially as set forth.

5. In combination with the elements of claim second, the strip *e′* and groove *e*, serving to steady the movement of the doors, as described.

In testimony of which invention, I hereunto set my hand.

CLEMENT OLHABER.

Witnesses:

GEO. H. KNIGHT,

JAMES H. LAYMAN.